Figure 1:
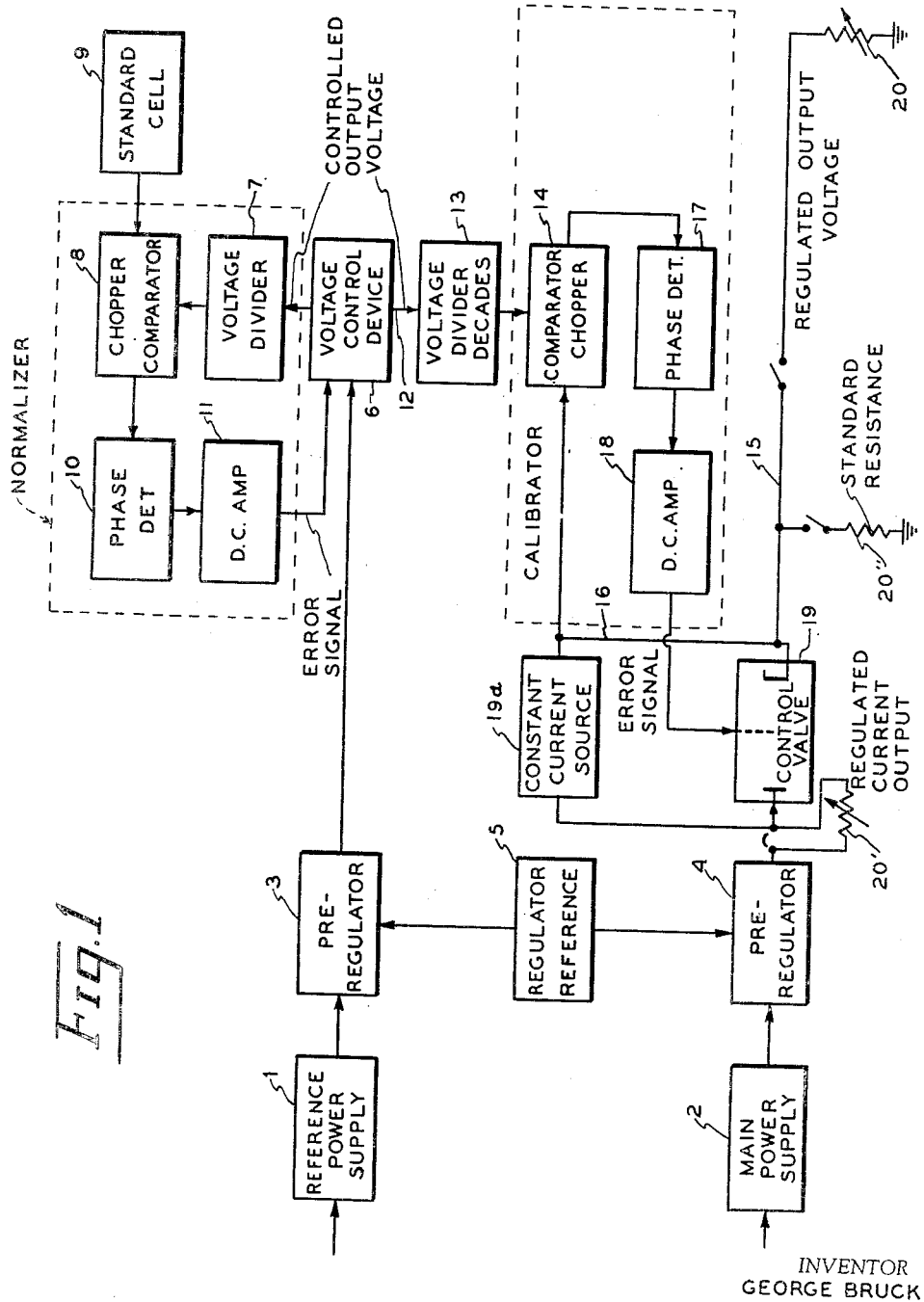

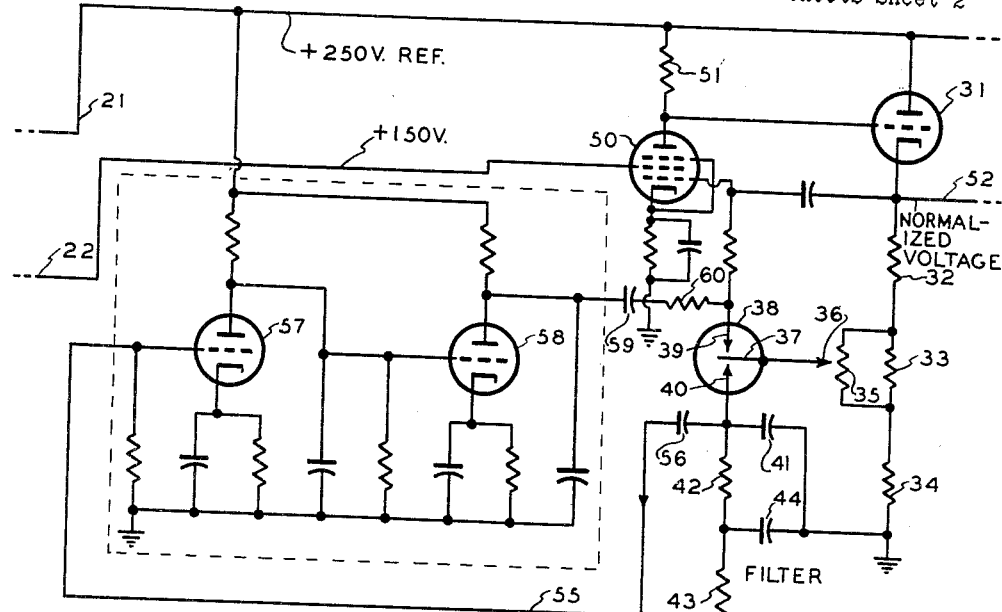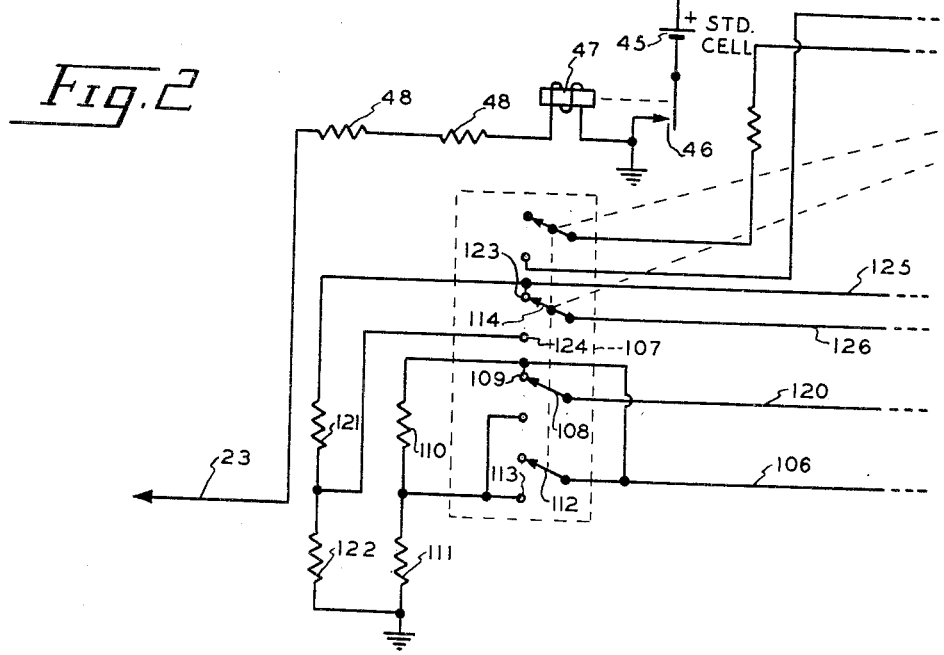
Fig. 2

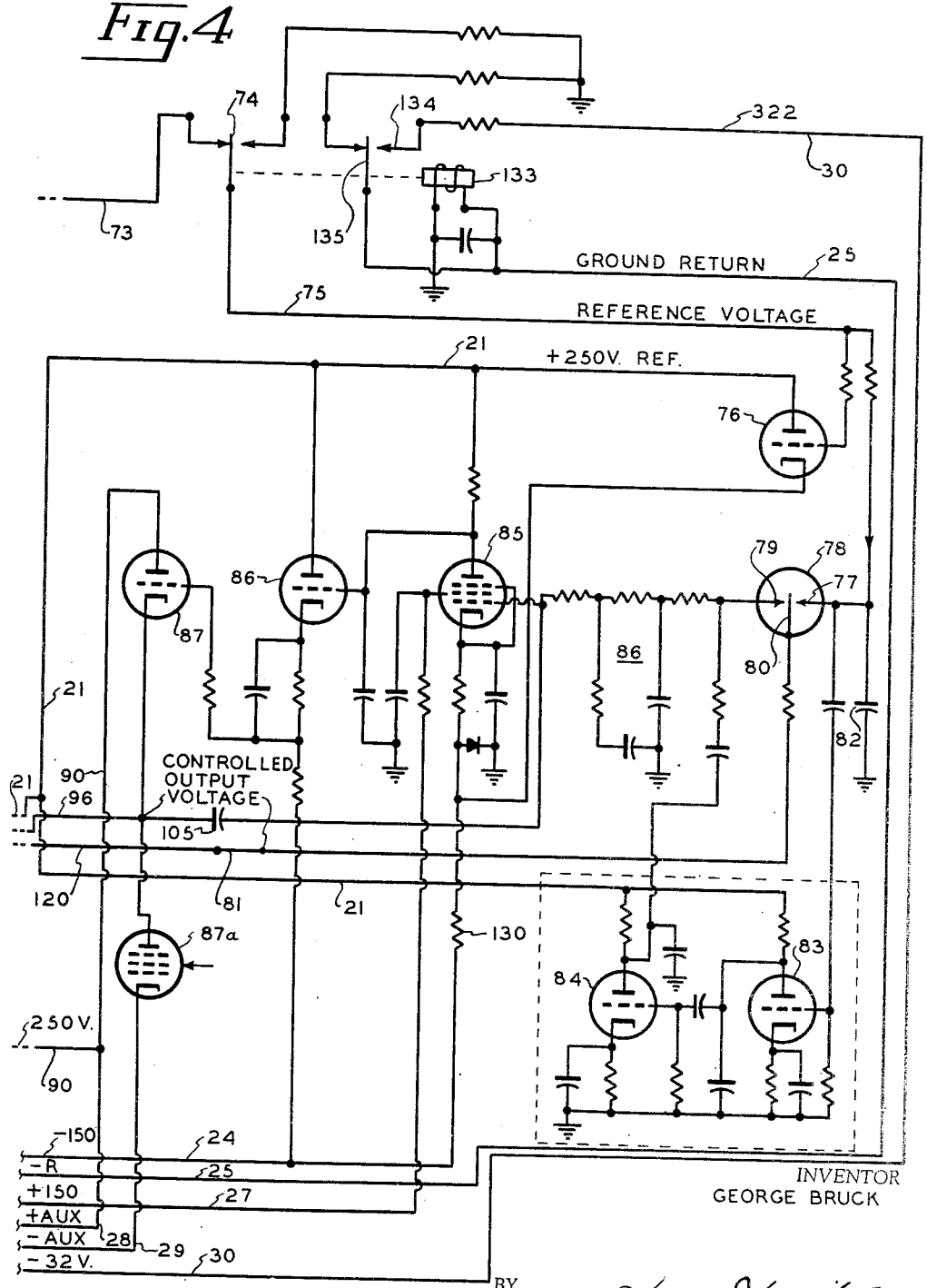

United States Patent Office 2,708,734
Patented May 17, 1955

2,708,734

AUTOMATIC REGULATORS

George Bruck, Melbourne Beach, Fla., assignor to Radiation, Inc., Melbourne, Fla., a corporation of Florida Application March 1, 1954, Serial No. 413,213

19 Claims. (Cl. 323—20)

The present invention relates generally to automatic regulators, and more particularly to systems for regulating the voltage or current output of a system, selectively, and for setting the regulated value selectively to any one of a wide range of values.

It is a broad object of the present invention to provide a novel system of voltage regulation.

It is a further broad object of the present invention to provide a novel system of current regulation.

It is still a further broad object of the present invention to provide a novel system for controlling selectively either current or voltage.

A further object of the present invention resides in the provision of a novel system for regulating voltage or current, and maintaining the amplitude of the regulated voltage or current at any one of a large number of selectable values.

It is a further broad object of the present invention to provide a novel comparison type voltage regulator, in which any of a large number of voltage values may be accurately maintained by comparison with the voltage of a standard voltage source.

It is still a further object of the invention to provide a novel comparison type current regulator, in which any of a large number of current values may be accurately maintained by comparison with the voltage of a standard voltage source.

Still a further object of the present invention resides in the provision of a novel comparison type voltage and current regulator, in any one of a large number of current or voltage amplitudes may be accurately maintained by comparison with the voltage of a standard voltage source.

It is another object of the present invention to provide a novel system of voltage or current regulation, in which a standard comparison voltage source of considerable current capacity is established by comparison with the voltage of a standard cell, itself incapable of current drain without damage, in which a portion of the comparison voltage is selected by means of a decade voltage divider, and in which an output voltage or current is maintained at a pre-selected value by comparison with the voltage output of the decade voltage divider.

It is still a further object of the present invention to provide a voltage or current regulator, which is capable of providing accurately regulated voltage or current output over ranges 0 to approximately 110 v. and 0 to approximately 110 ma., in steps respectively of .01 volt or .01 ma., for a wide variety of output loads.

The above and still further features, objects, and advantages of the present invention will become apparent upon consideration of the following detailed disclosure of a specific embodiment of the invention, especially when taken in comparison with the accompanying drawings, wherein:

Figure 1 is a functional block diagram of a regulator in accordance with the invention.

Figure 3:
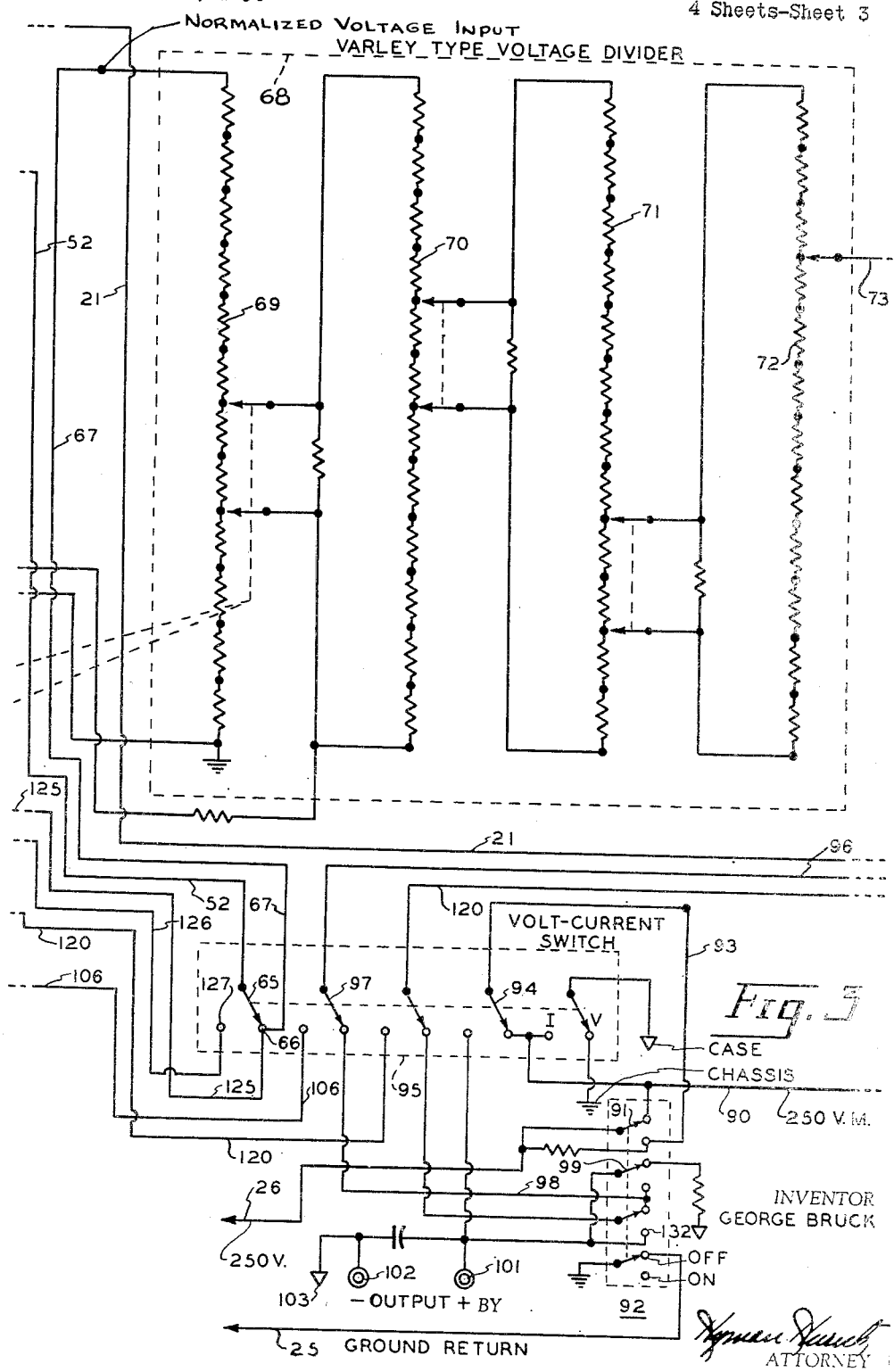

Figures 2-4 inclusive together are a schematic circuit diagram of a regulator in accordance with the invention.

Briefly describing a basic concept involved in the invention, a reference power supply furnishes power at +250 v. to a normalizer. The normalizer receives basic information from a built in standard cell and compares the voltage of this cell sixty times per second with a fraction of the normalizer output. Any error appears as a 60-cycle square wave, which is amplified, rectified in a phase sensitive detector, and used to correct the output of the normalizer.

The normalizer feeds 111.11 v. to an 11.111 ohm four decade Varley type voltage divider. A selected voltage output of the latter is compared 60 times per second directly with the output signal derived from a main regulated power supply and any error is used to correct the output by means of a second square wave amplifier and phase sensitive detector.

In regulating voltage, the load is connected in the cathode circuit of a regulator valve, and output voltage from the cathode connected with the comparison device. Voltage directly across the load is thus measured, and not a fraction of that voltage, so that accurate voltage regulation may be maintained for an extremely wide range of current values in the load, i. e. an extremely wide range of load values.

When current is to be regulated, the load is inserted in series with the anode of the regulator valve, and a voltage dropping resistance inserted in the cathode. Thereby a voltage is developed across the voltage dropping resistance which is proportional to the current in the load and this voltage is utilized as a basis for regulation. Current may thus be accurately regulated for a wide variety of load values, and independently of those values.

Referring now more particularly to Figure 1 of the accompanying drawings, the reference numeral 1 denotes a reference power supply, consisting basically of a rectifier of conventional character supplied from an A. C. source. The reference numeral 2 denotes a main power supply of the same type, and preferably is of considerable power capacity in comparison with reference power supply 1.

The output of power supply 1 is pre-regulated by any suitable system of voltage regulation 3, and the output of the main regulator 2 is similarly pre-regulated by means of a pre-regulator 4. Both pre-regulators may utilize the same regulator reference 5, which avoids differences in pre-regulated output voltage as between the reference and main power supplies due to variations in regulator references. The regulator reference 5 may be a VR tube, for example, only. The main and reference supplies are commonly pre-regulated to reduce the regulation burden of the following portions of the system.

The voltage output of the pre-regulator 3 is applied to a voltage control device 6 for accurate regulation of its value. A fraction of the voltage supplied by the voltage control device 6 is taken by voltage divider 7 and applied to one input of a chopper comparator, 8, at a value suitable for comparison with the voltage of a standard cell 9. The voltage output of the standard cell is compared with the output of the voltage divider 7 at the chopping rate of the chopper comparator 8, i. e. 60 cycles per second in a specific example of the invention, to generate a square wave having a phase and amplitude corresponding with the sense and amplitude of variation as between the outputs of the standard cell 9 and the voltage divider 7.

The square wave is phase detected at 10 to provide a rectified D. C. voltage having sense and magnitude corresponding with the phase and magnitude of the square wave, and the D. C. voltage is amplified in D. C. amplifier 11 and applied as an error signal to voltage control device 6. This error signal controls the controlled output voltage deriving from voltage control device 6, by comparison with the voltage of standard cell 9, and maintains an accurate value of voltage output, equal in one specific example of the present circuit to 111.11 v., in lead 12. This voltage may be denominated the "normalized" voltage, and the elements 7, 8, 10, 11 may be denominated the "normalizer."

It will be clear that the normalized voltage is a very accurately controlled voltage, derived from a source of some power capability and controlled basically by the extremely accurately maintained standard cell 9, and has a magnitude much greater than that of the standard cell, thus permitting a far greater range of regulated values to be developed by the system than would be possible were the output of a standard cell directly used for comparison purposes.

To this point in the system, moreover, current drain is invariable, which renders possible more accurate regulation.

The normalized voltage available on lead 12 is applied to the input of a Varley type voltage divider, 13, having four decades of 11.111 ohms maximum, in one example of the present system. The output of the voltage divider 13 may have any selected value, from 0 to 109.99 volts; by setting proper values in the several decades of the divider. The output of the divider is then supplied to a "calibrator," which essentially compares the output of the voltage divider 13 with a final regulated voltage output of the system.

To this end, the output of the voltage divider 13 is applied to a comparator chopper 14, for comparison with a voltage available on the main output lead 15 of the system, supplied via lead 16. The output of the comparator chopper 14 is a square wave having the frequency of the chopper, and a phase and amplitude dependent on the sense and magnitude of the deviation of the voltage on lead 15 from that supplied by the voltage divider 13.

The square wave output of the comparator chopper 14 is phase detected by phase detector 17, to provide a D. C. error voltage having magnitude and sense dependent on the phase and magnitude of the comparator chopper 14. This D. C. error voltage is amplified in a D. C. amplifier 18, and applied as a correction voltage to a voltage control device 19 supplied with voltage by pre-regulator 4. The output of the control device 19, at lead 15, is thus maintained equal to that supplied by the voltage divider 13, for all reasonable values of load 20.

The control device also may serve to maintain constant current in the load 20, proportional in ma. to the output of the voltage divider 13 in volts, but suitable operation of the circuit as illustrated in Figure 1. Basically, the regulated current flow is caused to generate a voltage at lead 15, and this voltage is controlled in order to regulate current.

It will be noted that in the voltage regulating condition of the system a load 20 is connected in the cathode circuit of a control valve device 19, via lead 15 and that it is the voltage on lead 15 which is compared with the output of voltage divider 13 to derive an error signal.

In the current measuring condition load 20 is placed, as 20', in series with the anode of control valve device 19, and a standard resistance 20'' connected in the cathode circuit, i. e. from lead 15 to ground. It is now the voltage across the standard resistance 20'' which is regulated, but this is directly proportional to current in load 20', so that control of voltage at lead 15 now serves to maintain current in load 20 constant, for any value of load resistance 20'', within reasonable limits.

The same general circuitry which serves to control voltage thus serves also to control current, and a relatively simple dual function equipment is thereby provided.

Referring now more particularly to Figure 2 of the accompanying drawings, certain power leads are shown which supply the following voltages, specified for example only.

21_____ 250 v. pre-regulated D. C. from reference source
22_____ 150 v. pre-regulated D. C. from reference source
23_____ 250 v. unregulated D. C. from main source
24_____ —150 v. bias voltage
25_____ Ground return for 250 v. main supply
26_____ 250 v. pre-regulated D. C. from main source
27_____ 150 v. D. C. regulated
28, 29___ Ungrounded regulated D. C. voltage deriving from an auxiliary source.
30_____ —32 v. voltage The various voltages derive from power sources in the form of rectifiers driven by A. C. sources, not generally illustrated, except in that the reference supply 1 and the main supply 2 are illustrated in Figure 1 of the accompanying drawings. The functions of the various voltages will appear as the description proceeds.

The voltage available on line 21, i. e. reference voltage, is applied in series with a regulator valve 31, having its anode directly connected with line 21 and its cathode in series with a cathode load comprising resistors 32, 33, 34 taken in series to ground. A voltage divider 35 is connected across resistance 33, and the variable tap 36 thereof supplies a fraction of the voltage on line 21. The tap 36 is connected with the vibrating arm 37 of a chopper 38, having two stationary contacts 39, 40.

The contact 40 is connected to one terminal of a charge-discharge condenser 41, having its remaining terminal grounded, and also via an RC filter composed of resistances 42, 43 and condenser 44 to the positive terminal of a standard cell 45. The negative terminal of the standard cell 45 is connectible to ground via a relay operated switch 46, the relay 47 being operated to close switch 46 when the main power supply comes up to voltage, and to this end being connected in line 23 via protective resistances 48.

The stationary contact 39 of the chopper 38 is connected to the control grid of a pentode 50, plate loaded by resistance 51, supplied with current from line 21, and having its anode connected with the control grid of triode 31. Pentode 50, accordingly, constitutes a control device for regulator tube 31. Any variation in bias of the control grid of the pentode 50 results in a variation of potential at its anode, of opposite sense, and this variation is reflected in a variation of the internal impedance of triode 31, and hence of the voltage available at the cathode of triode 31. The normalized voltage of 111.11 v. is available at lead 52, connected to this cathode.

It will be clear that while the movable armature 37 is not in contact with stationary contact of chopper 38 the voltage across condenser 41 is precisely that of the standard cell 45. When the armature 37 makes contact with the stationary contact 40, the standard cell being isolated by its filter 42, 43, 44, the condenser 41 assumes a voltage equal to that at tap 36 of potentiometer 35. When the contact is broken the condenser 41 re-assumes its normal voltage. It is thus evident that if there is any difference in value, as between the voltage at tap 35 and the voltage of standard cell 45, a square wave voltage variation will be generated across condenser 41. This square wave will be less or more positive, when armature 37 makes contact with contact 40, depending on whether the voltage at tap 36 is below or above that of the standard cell 45. In this sense, the square wave across condenser 41 has a phase, as well as an amplitude, dependent respectively on the sense and magnitude of the deviation of the voltage at tap 36 from the voltage of standard cell 45.

The square wave voltage variation at condenser 41 is supplied over lead 55 and via coupling condenser 56, to the input of a conventional two stage plate loaded square wave amplifier, having triodes 57, 58 in cascade. The output voltage of the triode 58 is coupled from the anode of the triode 58, via a condenser 59 and a resistance 60, in series, to stationary contact 39 of chopper 38. Due to the coupling condenser 56 the D. C. components of the pulses on lead 55 is eliminated, and the pulses as amplified are A. C. pulses.

The armature 37 and stationary contact 39 of chopper 38 serve to rectify the A. C. pulses and condenser 59 with resistance 60 serve to smooth the rectified pulses, so that a filtered D. C. voltage is supplied to the control grid of pentode 50. The rectification occurs because the negative half cycles of square wave, in our example wherein the voltage of tap 36 exceeded that of the standard cell 45, are by-passed to ground when armature 37 contacts contact 39. There is thus provided in alternation, and in synchronism with the square wave, a low impedance path for the square wave.

The polarity of the D. C. voltage made available at the contact 39 is the same as the sign of the deviation of the voltage of tap 36 from that of standard cell 45. Its magnitude is amplified. Continuing our example, an increase in grid bias of pentode 50 lowers its plate voltage, which increases the internal impedance of triode 31, and hence reduces the voltage at tap 36. The tendency of the system is therefore to equalize the values of voltage at tap 36 and at standard cell 45.

A similar set of events and process of reasoning may be followed out for a relative decrease of voltage at tap 36.

The detailed description so far has concerned itself with the production of a normalized voltage at lead 52.

This normalized voltage is (see Figure 3) delivered to switch contact 65, and thence to contact 66, and via lead 67 to the input of a Varley type voltage divider 68, having four decades, 69, 70, 71, 72, independently adjustable, and having a final output at lead 73. It is a known property of this type of voltage divider, which is known per se and described in the literature, that it possesses the same input resistance for all possible settings. This property makes it particularly valuable in the present application, since thereby variation of output voltage setting does not affect the so-called normalized voltage, and exceedingly accurate regulation thereof is readily feasible.

The voltage on lead 73, which is equal to the desired output voltage of the system, and is used for comparison, is applied via normally closed switch 74, and lead 75 to the control grid of a triode 76, and to the stationary contact 77 of a chopper 78, the latter having a further stationary contact 79 and a vibrating armature 80.

As will appear, the final controlled output voltage appears at lead 81, which is connected to the vibrating armature 80 of vibrator 78. There is then developed a square wave voltage variation across condenser 82, and having a phase and magnitude dependent upon the sense and degree of deviation of the output voltage at lead 81, with respect to the reference voltage on lead 75, deriving from the Varley voltage divider. The voltage across condenser 82 is a condenser coupled at the input of a conventional plate loaded two stage square wave amplifier comprising triodes 83, 84, cascaded, and the output of the triode 84 is applied to the stationary terminal 79 of chopper 78, where it is synchronously rectified, so that a D. C. voltage appears on the control grid of the control pentode 85. The D. C. voltage is of square wave form as it appears at the contact 79, but is smoothed by the RC filter 86, so that it represents a steady value at the pentode 85. The pentode 85 is plate loaded, and is coupled via a cathode loaded stage comprising triode 86, to control triode 87, the latter having voltage output terminal in its cathode circuit, for the condition of the system in which voltage is regulated.

It will be noted that the anodes of the pentode 85 and the triode 86 are connected with lead 21 at 250 v. reference voltage and that the cathodes of these tubes are brought back through appropriate resistances to a −150 v. lead 24. The triode 86 then operates as a bias changing D. C. amplifier, permitting a negative bias to be applied to the triode 87.

The anode of the triode 87 is connected to a lead 90, connected to the 250 v. main power supply, in a path traceable as follows. In Figure 3, the 250 v. main lead is identified by reference numeral 26. This lead proceeds to a movable switch contact 91 of an "on-off" switch 92, illustrated in the "off" position. In the "on" position the movable contact 91 completes a circuit to lead 93, and thence to movable contact 94 of a multiple contact two position switch 95, which in the position illustrated establishes a voltage regulating condition (V), and in the alternative position establishes a current regulating condition (I). From contact 94 the path extends to lead 90, which supplies the anode of triode 87 directly.

The cathode of triode 87 proceeds, in one path, to lead 96, switch contact 97, lead 98, contact 99, and positive output terminal 101. The negative output terminal 102 is directly connected with "case ground," 103, which is to be distinguished from chassis ground, represented by the "conventional ground" symbol. It will be realized that chassis and case of the present equipment are isolated, one from the other, the system employing two grounds to simplify wiring.

It will be noted that the anode of the triode 87 is connected to lead 28, and the cathode to the lead 29. The leads 28, 29 supply auxiliary voltage, regulated, and serves to establish an operating point for the triode 87, by causing a value of current to flow from anode to cathode of the triode 87, supplementary to that supplied by the main power source, without tying any electrode of triode 87 to any specific reference point, but establishing a fixed voltage difference between anode and cathode of triode 87, for all total values of output current and voltage.

Summarizing the operation of the triode 87, it is in series between the main regulated power supply lead and the load, when operating to regulate voltage, the load being in its cathode circuit. The auxiliary voltage supply floats directly from anode to cathode of triode 87. The control of the bias of the triode 87, by the triode 86, varies its internal resistance, and thereby varies the current flowing to the load, and hence the voltage across the load. The system permits the current to flow which is required by the load to develop a voltage across the load, equal to that established by the Varley voltage divider 88.

Essentially, the cathode of the triode 87 is connected directly with the output terminal 101. It is also coupled via condenser 105 to the control grid of the pentode 85. This connection establishes an A. C. series loop from the output terminal 101, and serves to eliminate A. C. or transient variations of voltage at that terminal.

Proceeding now to a description of the current regulating system, and briefly describing same, the load is connected between the main supply, and the anode of the triode 87, which is supplied with resistance of selective value in its cathode circuit. Voltage is taken across the latter for comparison with the reference voltage supplied from the Varley voltage divider, and by maintaining the voltage across the cathode resistance at the reference value, the current in the load is controlled or maintained at a corresponding or proportionate value.

Tracing the circuits, by reference to the accompanying drawings, we assume that the switch 95 is in I position, and the switch 92 in "on" position. The terminal 101 is then connected via contact 94, lead 93, contact 91, to lead 26, which is the positive main supply lead. The negative load terminal 102 is permanently connected with "case ground," which in the I position of switch 95 connects to the lead 90, and thence to the anode of triode 87. The load 96 proceeds to contact 97, and thence to lead 106, which proceeds to a two position switch 107. In the position shown lead 106 is connected to ground via resistances 110, 111 in series. Lead 120 is similarly connected via contacts 108, 109. In the alternative position of the switch 107 lead 106 is connected to ground via contacts 112, 113 and resistance 111 alone and lead 120 similarly via contact 108.

The switch 107 is mechanically ganged with the Varley voltage divider 88, so that when the first decade of the Varley voltage divider 88 is in zero position, the contacts 108, 112, and 114 are in the upper position (illustrated). When in any other than zero position the contacts 108, 112, 114 are in the lower position. The resistance values of resistors 110, 111 are respectively 900 ohms and 100 ohms in one specific example of the present system. It follows that a relatively small cathode resistance is employed for lower output values of current, which do not require the highest or tens decade of the Varley voltage divider 88. For the tens decade a high cathode resistance is employed, at decade 87, and the specific values are such that an effective change of scale takes place in comparison voltage at the cathode resistance, when a transition in desired current values is requested, from units and smaller, to tenths of milliamperes.

At the time that contacts 108, 112, 114 are in their upper positions, and lead 106 connects resistances 110, 111 in series into the cathode of triode 87, in the I condition of the instrument, the switch 108 has also connected the resistances 110, 111 in series to lead 120, which in the position of switch 95, connects to lead 81 and hence directly to the chopper armature 80. Since the chopper armature 80 is tied back to the cathode of triode 87, two paths lead from resistors 110, 111 to the chopper armature 80.

When the contacts 108, 112, are in the lower position the resistance 110 is shorted out by contact 112, and only the resistance 111 remains effectively in circuit.

Considering now the resistances 121, 122, both resistances in series are connected from ground to contact 123. Resistance 122 alone is connected from ground to contact 124. Resistances 121, 122 in series are thus connected permanently via lead 125, to contact 66 of switch 95, and therefore to lead 67 and to lead 52, in the V position of switch 95. These resistances (100K and 10K respectively) are therefore in parallel to the input of the Varley divider 88, and also via contact 65 and lead 52 in parallel with the cathode load of triode 31. However, the resistance of resistances 121, 122 in series is sufficiently great in comparison with the values it parallels that it has no effect on the circuit in this position. Simultaneously, the resistances 121, 122 in series are connected via contacts 123, 114 and lead 126, to contact 127 of switch 95, open in the V position of the switch 95, and connected to lead 52 in the I position. Hence resistances 121, 122 are similarly connected, with respect to triode 31, for both I and E positions. When, however, the tens decade of the Varley divider 88 becomes operative contact 114 is lowered to contact with contact 124. At such time resistance 122 alone is connected to lead 126, which leads to an open contact of switch 95 in the V position, and to lead 52, and the cathode of triode 31 in the I position of switch 95.

The resistances 121, 122 have no effect in the V position of switch 95, because their combined value is considerably greater than the resistance of the Varley divider 88 as seen from its input. In the I position, however, when a change of scale takes place by virtue of switching of resistances 110, 111, a corresponding compensation takes place in the resistance across the cathode circuit of triode 31, which is now parallel with resistance 122 alone, and simultaneously by the introduction of resistance 121 (100K) in series between the cathode of triode 31 and the input to the Varley divider 88, i. e. across leads 125, 126. The Varley divider 88 thus becomes one arm of a voltage divider, the other arm of which (resistance 121) has a resistance value of 100 kilohms. Since the Varley divider itself looks like 10 kilohms at its input, its input voltage is divided by a factor of 10 Simultaneously the resistances 110, 111 have reduced the scale of voltages applied to chopper 80, for comparison, by a factor of 10. The entire system thereby operates at a lower voltage level in controlling current, which enables the system more expeditiously to respond to the higher values when called for by the dial settings.

It will be noted that a triode 76 is connected in parallel effectively with pentode 85. While the latter is supplied with error signal only, the grid of the triode 76 is supplied directly with reference voltages at lead 75.

The cathode of triode 76 is connected to the same cathode resistance 130 as pentode 85, and thence to a negative bias at lead 24. Hence, the current drain by triode 85 affects the bias of pentode 85 by introducing voltage drop in its cathode circuit. We assume that the present system, absent triode 76, is relatively sluggish in its response to a change of condition. In such case switching from one required output value to another radically different one results in an extremely high wave voltage variation at chopper 78, with consequent saturation of the amplifier 83, 84. So long as the amplifier is saturated it does not properly supply error signal. Hence, the system does not operate properly.

The triode 76 prevents this contingency by varying the cathode bias of the pentode 85 in accordance with voltage level requested by the Varley divider, to meet that requested at the chopper 80. An increase in reference voltage, caused by switching the Varley divider, causes a corresponding increase of cathode voltage at pentode 85, due to cathode current increase in triode 76. This increase in cathode voltage causes an increase in anode voltage, which is communicated via cathode follower triode 86 to regulator valve 87. The latter generates a large output voltage at its cathode, which feeds back to the control grid of pentode 85 and to the contact of chopper 78, to reduce the square wave generated to a sufficiently low value that square wave amplifier 83, 84 is not saturated.

An analogous set of events takes place for a decrease of reference voltage.

The pentode 85 operates, accordingly, in response both to error signal and to absolute level of reference voltage, so that a large error signal, greater than can be handled by the system, will not occur. This expedient is necessary because of the extremely wide range of values of reference voltage to which regulation must be accomplished in the present system, which is greater than can be handled by the servo-loop of the chopper 78.

It will be recalled that lead 25 is a ground return lead for the main power supply. This lead returns to ground at contact 132 of "on-off" switch 92, in the "off" position. In the "on" position this ground is removed, but a connection to ground via relay 133 remains. The relay 133 is a marginal relay which operates only on overload of the main supply, and thus serves as a protective device therefor. When relay 133 operates it completes a locking circuit from lead 30 via contacts 134, 135, which supplies relay 133 with −32 v., and serves to lock same in. At the same time contact 74 is actuated to the right, and completes a circuit to ground for lead 75. Thus, contact 77 of vibrator 78, and control grid of triode 76 are brought to ground potential, and locked at that potential, in response to a temporary overload of the main power supply, and it is necessary to ground lead 25 at contact 132, to remove voltage from relay 133, and thus to replace ground with reference voltage at contact 77 of vibrator 78, and at the control grid of triode 76. This operation, however, also disconnects the load from the power supply. An overload, therefore, cannot damage the system.

While I have described and illustrated a specific embodiment of my invention, variations of detail and arrangement may be resorted to without departing from the true spirit of the invention as defined in the appended claims.

What I claim is:

1. In combination, a source of unregulated voltage, a voltage responsive variable impedance device in series with said unregulated voltage, a voltage divider between a point of said variable impedance and a point of reference potential, a source of standard voltage, means for deriving a regulated voltage from said voltage divider, means for comparing said regulated voltage with said standard voltage, said last means comprising a vibrator contact for sampling said regulated voltage and said standard voltage in periodic alternation and thereby generating an A. C. voltage at said vibrator contact having a phase and amplitude determined by the relative and absolute amplitudes of said regulated voltage and said standard voltage, means for amplifying said A. C. voltage, means for phase and amplitude detecting the amplified A. C. voltage to derive an error voltage, and means responsive to said error voltage for controlling said variable impedance so as to reduce said error voltage.

2. In combination, a source of standard voltage, means for deriving a controlled voltage of fixed amplitude by comparison of said controlled voltage with said standard voltage, a constant resistance load connected across said controlled voltage of fixed amplitude, means for deriving any one of a plurality of fixed voltages from said constant resistance load, a source of relatively unregulated voltage, a voltage output lead, means for comparing said any one of a plurality of fixed voltages with the voltage of said voltage output lead and deriving an error voltage, and means responsive to said error voltage to control said voltage responsive regulating device.

3. A voltage and current regulator comprising, a source of D. C. voltage and current, a voltage regulator vacuum tube in series with said source of D. C. voltage and current, said vacuum tube having a cathode circuit and an anode circuit, means for connecting a variable load in said cathode circuit, a source of standard voltage, and means for regulating the voltage across said load in said cathode circuit to equality with said standard voltage, a standard resistance, means for connecting said load in said anode a circuit and said standard resistance in said cathode circuit, and means for regulating the voltage across said standard resistance to equality with said standard voltage, to regulate current in said load.

4. In a current regulator, a source of current, a regulator device in series with said source of current, a standard resistance in series with said source of current and said regulator device, a source of standard voltage, means for comparing the voltage of said source of standard voltage with the voltage across said standard resistance, and means responsive to said means for comparing for maintaining equality of said voltages in order to maintain a regulated flow of current from said source of current.

5. In a voltage regulator, a source of standard voltage, a source of regulated voltage, a vibrator having a first stationary contact, a second stationary contact, a vibrating armature, and means for actuating said vibrating armature alternately into contact with said first and second stationary contacts, means for connecting said source of standard voltage with said first stationary contact, means for connecting said source of regulated voltage with said vibrating armature, a vacuum tube amplifier having a control grid and a cathode circuit, means for connecting said control grid to said second stationary contact, a storage condenser connected intermediate said first stationary contact and said vibrating armature, and an A. C. servo loop connecting said first stationary contact and said second stationary contact.

6. The combination in accordance with claim 5, wherein is further provided means for substantially maintaining the D. C. bias of said vacuum tube proportional to said standard voltage.

7. The combination in accordance with claim 6 wherein said last means includes means for injecting said D. C. bias into the cathode circuit of said vacuum tube.

8. In a signal amplitude regulator, operable to maintain preselectable values of D. C. signal in resistive loads having any one of a relatively large range of values, a first standard voltage source, a second source of voltage having greater amplitude than the standard voltage source, means for periodicaly comparing the voltage of said first standard voltage source with a predetermined fraction of the voltage of said second source of voltage, said last means comprising means for generating a square wave voltage having a magnitude and a phase dependent on the relative values of first standard voltage source and said predetermined fraction of the voltage of said second source of voltage, means for producing a D. C. error signal in response to said square wave, said error signal having a polarity and magnitude dependent on the phase and magnitude of said square wave voltage, and means responsive to said D. C. error signal for reducing the relative magnitudes of said voltage of said first standard voltage source, and said predetermined fraction of the voltage of said second source of voltage.

9. The combination in accordance with claim 8, wherein said means for generating a square wave voltage and said means for producing a D. C. error signal are comprised of a mechanical vibrating switching device having two stationary contacts and a vibrating contact which alternately makes contact with the respective stationary contacts, means for applying said standard voltage to one of said contacts, means for applying said predetermined fraction of the voltage of said second source of voltage to another of said contacts, means connected with said one of said contacts and said another of said contacts for generating a square wave of voltage proportional in amplitude and having a phase in accordance with the relative magnitudes of said standard voltage and said predetermined fraction of the voltage of said second source, means for amplifying said square wave of voltage, means for applying the amplified square wave of voltage to the remaining contact for synchronous rectification thereby, the synchronously rectified signal constituting said error signal.

10. The combination in accordance with claim 8 wherein is further provided a multiple decade voltage divider having an input connected with said second source of voltage, said multiple decade voltage divider having constant resistance for a plurality of decade settings.

11. The combination in accordance with claim 8, wherein is further provided a Varley type multiple decade voltage divider having input terminals, and means for connecting the input terminals to said second source of voltage.

12. The combination in accordance with claim 8 wherein is further provided a multiple decade voltage divider having input terminals connected with said second source of voltage, said multiple decade voltage divider having constant resistance for a plurality of decade settings, and having output terminals at which are available any one of a plurality of decade related voltages, a source of main D. C. power, means for varying the D. C. voltage output of said source of main D. C. power in correspondence with the voltage of said output terminals, said last means comprising means for generating a further square wave voltage having a phase and a magnitude dependent on the sense and magnitude of the difference between the voltages of said D. C. voltage output of said source of main D. C. power and the voltage of said output terminals, means for amplifying said further square wave voltage, means for rectifying said further square wave voltage so as to generate a further rectified error voltage having a magnitude and polarity dependent on said last mentioned difference, and means responsive to said error voltage for regulating said source of main D. C. power so as to reduce said rectified error signal.

13. The combination in accordance with claim 8 wherein is further provided a multiple decade voltage divider having input terminals connected with said second source of voltage, said multiple decade voltage divider having constant resistance for a plurality of decade settings, and having input terminals at which are available any one of a plurality of decade related voltages, a source of main D. C. power, means for varying the D. C. current output of said main D. C. power source in correspondence with the voltage of said output terminals, said last means comprising means for generating a comparison D. C. voltage proportional to the D. C. current output of said D. C. current output, means for generating a further square wave voltage having a phase and a magnitude dependent on the sense and the magnitude of the difference between the voltages of said output terminals and said comparison D. C. voltage, means for rectifying said further square wave voltage so as to generate a further rectified error voltage having a magnitude and a polarity dependent on said last mentioned difference, and means responsive to said error voltage for regulating said source of main D. C. power so as to reduce said rectified error signal.

14. A voltage and current regulator, comprising a low power rectifier reference power supply, a high power rectifier main power supply, means for deriving a reference voltage from said reference power supply, a standard voltage cell, means for normalizing said reference voltage by comparison with the voltage of said standard voltage cell, means for deriving a selected predetermined fraction of the normalized voltage, said last means providing a constant resistance as seen by said means for deriving a reference voltage, whereby said reference power supply operates at substantially constant load for all selected predetermined fractions of the normalized voltage, and means for controlling the output of said high power main power supply in correspondence with the selected predetermined fraction of the normalized voltage.

15. In a signal regulator, a reference rectifier power supply, a main rectifier power supply, a standard voltage cell, a regulator circuit responsive to D. C. control voltage for controlling the D. C. voltage output of said reference rectifier power supply, means for normalizing said D. C. voltage output in response to the voltage of said standard voltage cell, means for deriving a predetermined selective fractional voltage from said D. C. voltage output, means for controlling a voltage output derived from said main rectifier power supply, said last means including means for comparing said voltage output with said predetermined fractional output, and means responsive to said means for comparing for maintaining substantial equality of said voltage output with said predetermined selective fractional voltage output.

16. In a signal amplitude regulator, a reference power supply, a main power supply, a standard voltage cell, means for regulating the voltage output of said reference means by reference to the voltage of said standard voltage cell, means for regulating selectively the current and voltage output of said main power supply by reference to the regulated voltage output of said reference power supply.

17. In a signal amplitude regulator, a reference power supply, a main power supply, a standard voltage cell, means for regulating the voltage output of said reference power supply to an invariable value by reference to the voltage of said standard cell, a constant input resistance multiple decade voltage divider connected to divide said voltage output in decade steps, to provide fractional voltage output, a voltage regulating valve in series with said main power supply, said voltage regulating valve having an anode circuit and a cathode circuit, means for regulating the voltage in said cathode circuit in accordance with said fractional voltage output, and means for selectively inserting a random load resistance in said cathode circuit and for inserting said random load resistance in said anode circuit and a standard resistance network in said cathode circuit.

18. The combination in accordance with claim 17 wherein each of said means for regulating includes a chopper switching device for generating a square wave voltage having phase and magnitude dependent on the deviation of two D. C. input voltages, and having a D. C. error output signal having a polarity and magnitude dependent on the phase and magnitude of said square wave voltage.

19. The combination in accordance with claim 17 wherein is provided means for fractionally reducing the voltage input to said decade voltage divider by a predetermined factor, and wherein said standard resistance network is a voltage divider having said predetermined factor as a divider value.

References Cited in the file of this patent

UNITED STATES PATENTS

| | | |
|---|---|---|
| 2,594,572 | Lupo | Apr. 29, 1952 |
| 2,645,750 | Goodwin | July 14, 1953 |